United States Patent Office 3,446,413
Patented May 27, 1969

3,446,413
TUBULAR FRAME PACKAGE AND
BLANK THEREFOR
Joseph H. Sherrill and Jesse R. Pinkham, Winston-Salem, N.C., assignors to R. J. Reynolds Tobacco Company, Winston-Salem, N.C., a corporation of New Jersey
Filed Jan. 19, 1967, Ser. No. 610,340
Int. Cl. B65d 13/04, 17/20
U.S. Cl. 229—23                               17 Claims

ABSTRACT OF THE DISCLOSURE

A tubular frame package or blank having a corner structure in panels of the frame or blank in which one panel is scored along a straight line, another panel is scored along diverging lines to provide for infolding, and a third panel is slit and scored to provide for flaps. In the tubular frame structure, the flaps may be secured to a panel surface; a flap may extend into a corner of an opposing panel surface to provide greater rigidity to the package.

A tear tape is provided about an open face of a tubular frame package to provide for the tearing of a wrapper.

In a tubular frame package two frame sections, one overlying the other, are employed to form an end closure of the package, with the underlying frame section having an opening through one of its panel surfaces to provide access to the interior of the package.

A tubular frame structure may hold a tray therein or may support a sheet to provide a supporting surface.

Brief summary of the invention

This invention relates to packages and blanks therefor, and more particularly to a tubular frame package and a blank therefor.

Tubular frame packages have been employed in the past. Scudder Patent No. 1,065,398; Silver Patent No. 3,082,864 and Burt Patent No. 3,159,274 are representative of such tubular frame packages. Gintoft Patent No. 3,254,434 is representative of a tubular frame structure. Such tubular frame structures of the prior art may include corners that are not particularly strong. In the present invention a reinforced corner structure is provided for a tubular frame package by creating flaps in a panel surface, at least one of which abuts a corner in an opposing panel surface for reinforcement of the corner. Alternatively, one of such flaps may be secured to a panel surface and another panel surface may be infolded at the corner for reinforcement of the corner. Such reinforcement of a tubular frame structure has not been employed in the prior art.

The invention also contemplates a tear tape arrangement for a tubular frame package and an end closure for such a package, as noted above in the Abstract of the Disclosure.

Accordingly, an object of the present invention is to provide an improved tubular frame package and blank therefor, particularly employing improved corner structure, tear tape and end closure.

Brief description of the several drawings

Detailed description

Figures 1, 2, 3, 4, 5:
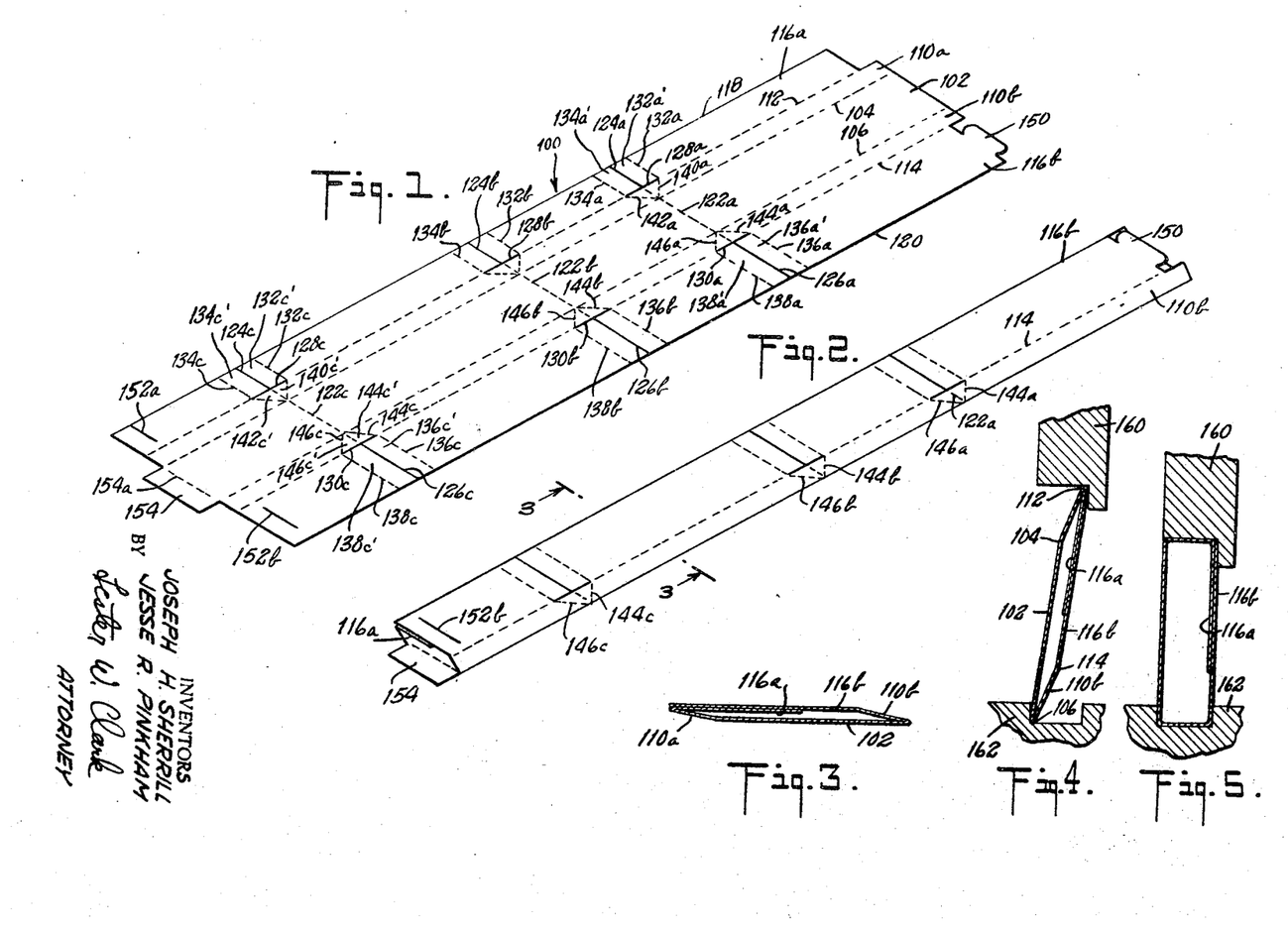
FIG. 1 is a perspective view of a blank in accordance with the invention.
FIG. 2 is a perspective view of a collapsed tubular frame structure formed from the blank of FIG. 1.
FIGS. 3, 4 and 5 are sectional views of the tubular frame structure of FIG. 2 showing how the structure may be erected from a collapsed form.

Referring to FIG. 1, a blank 100 for a tubular frame package in accordance with the invention is shown. The blank is typically of paperboard and includes a middle longitudinal panel 102 defined by longitudinal score lines 104 and 106 extending from one end of the blank to the other. Two intermediate longitudinal panels 110a and 110b are formed in the blank, defined respectively by longitudinal score lines 104, 112 and 106, 114. Two outside longitudinal panels 116a and 116b are formed in the blank and are defined respectively by longitudinal score line 112, outside longitudinal edge 118 and longitudinal score line 114, longitudinal outside edge 120. Three transverse score lines 122a, 122b and 122c are included extending across the middle longitudinal panel 102 and across the two intermediate panels 110a and 110b.

Each of the outside longitudinal panels 116a and 116b includes three primary cuts thereacross. That is, the outside longitudinal panel 116a includes cuts 124a, 124b and 124c, while the outside longitudinal panel 116b includes cuts 126a, 126b and 126c. Each of the cuts is in line with a corresponding transverse score line. For example, the cuts 124a and 126a are in line with the transverse score line 122a. Three secondary cuts 128a, 128b, and 128c extend along the longitudinal score line 112 and intersect the inside ends of cuts 124a, 124b and 124c, respectively. Similarly, secondary cuts 130a, 130b and 130c are included along the longitudinal score line 114.

The ends of each of the secondary cuts are joined by transverse score lines (which extend across the outer longitudinal panel) to the longitudinal edge of the panel. For example, score lines 132a and 134a extend parallel to the primary cut 124a across the outside longitudinal panel 116a from the ends of secondary cut 128a to the panel edge 118. Taking as an example the secondary cut 130b on the other side of the blank, the ends of that cut are joined by score lines 136b and 138b (which extend parallel to the primary cut 126b across the panel) to the outer panel edge 120.

Diagonal score lines also extend from the ends of the secondary cuts to a point on the associated transverse score line. For example, diagonal score lines 140a and 142a extend from the ends of the secondary cut 128a through the point of intersection of the transverse score line 122a and the longitudinal score line 104. On the other side of the blank, for example, diagonal score lines 144b and 146b extend from the ends of the secondary cut 130b to the intersection of the transverse score line 122b and the longitudinal score line 106. Such diagonal score lines are included for the purpose of infolding of blank material to form a corner, which will be explained in more detail below.

The outside longitudinal panel 116b includes a tab 150 at one end thereof and a slit 152b at the other end thereof. A corresponding slit 152a is included in the outside longitudinal panel 116a.

In the blank of FIG. 1, the middle longitudinal panel 102 at the end of the blank including the slits 152a and 152b may protrude slightly beyond the ends of the outside longitudinal panels 116a and 116b and the intermediate longitudinal panels 110a and 110b. This extension, together with score line 154a, provides a flap 154 as shown.

The blank of FIG. 1 may be formed to a tubular frame as shown in FIG. 2. Typically, the outside longitudinal panel 116b containing the tab 150 at one end thereof is made to overlie the other outside longitudinal panel 116a. The abutting portions of the outside longitudinal panels may be adhesively secured together by any means. Typically, the blank 100 is made of heat sealable material so that the longitudinal panels 116a and 116b may be adhesively secured together by the application of heat and pressure.

FIGS. 2 and 3 show the tubular frame in a collapsed state in which it is normally shipped. To erect or "set-up" the collapsed frame, the frame is typically positioned between a pair of movable frame holders 160 and 162 which move from the positions shown in FIG. 4 to the positions shown in FIG. 5 to set-up a frame having a rectangular cross section. The frame pivots about the longitudinal score lines 104, 106, 112 and 114 to assume its rectangular sectional shape.

Figures 6, 7, 8, 9, 10, 11:
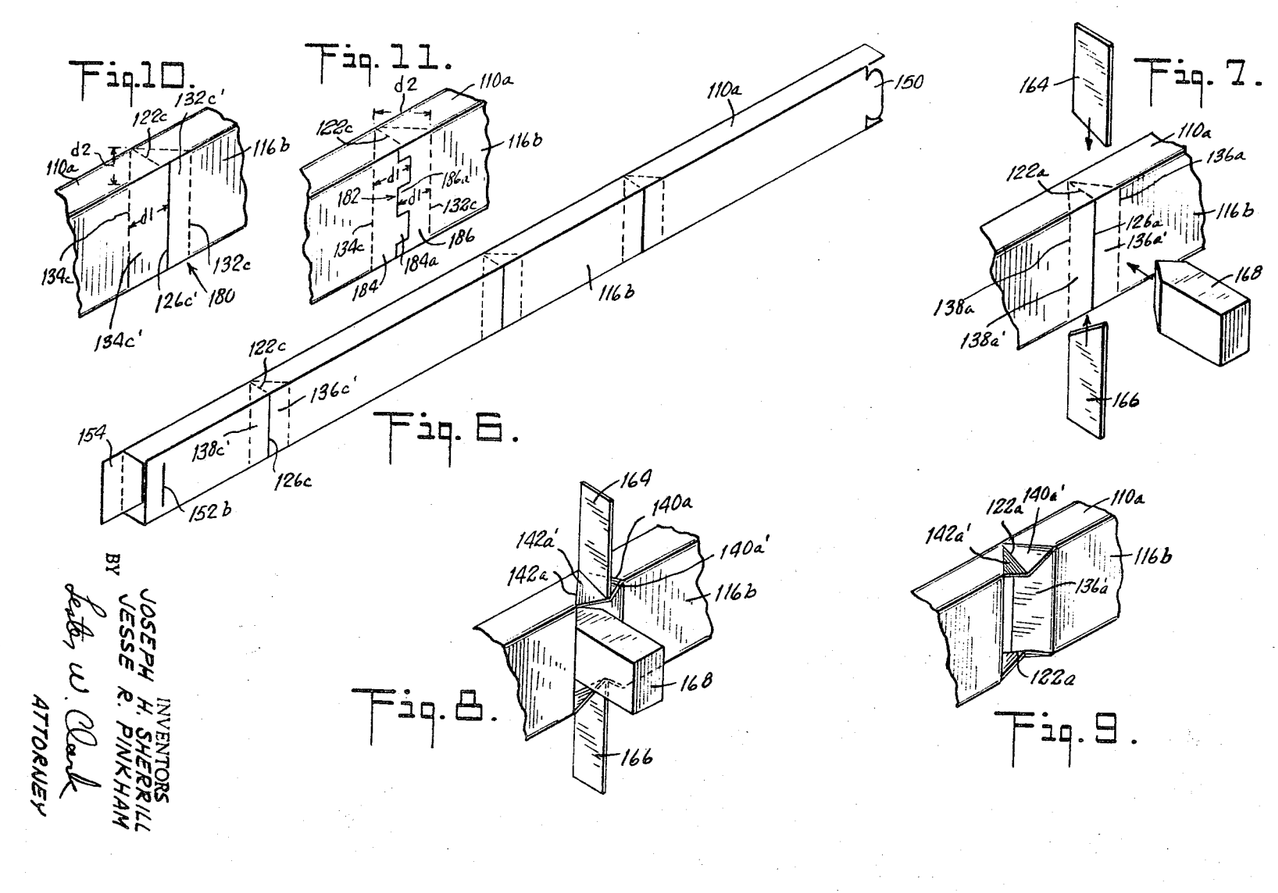
FIG. 6 is a perspective view of the tubular frame structure of FIG. 2 in erected form.
FIGS. 7, 8 and 9 are fragmentary perspective views showing the formation of a corner in the tubular frame structure of FIG. 6.
FIGS. 10 and 11 are fragmentary perspective views of modified corner arrangements in a tubular frame package such as shown in FIG 6.

FIG. 6 shows the tubular frame in perspective, set-up to its rectangular shape in section.

Corners may be formed in the tubular frame by the technique shown in FIGS. 7–9. In FIG. 7 a pair of movable blades 164 and 166 impinge against the intermediate longitudinal panels 110 and 110b of the frame. The blade 164 impinges against the portion of the transverse score 122a extending across the intermediate panel 110a. The blade 164 moves downwardly as shown in FIG. 8 against the score line to crease the intermediate panel 110a about the score line 122a as well as the diagonal score lines 140a and 142a, and to form triangular flaps 140a' and 142a'. The blade 166 moves upwardly as shown in FIG. 8 against the other end of the score line 122a across the intermediate panel 110b shown in FIG. 1. Concurrently, a wedge-shaped member 168 (FIGS. 7 and 8) moves against the cut 126a in the outside longitudinal panel 116b. When the wedge-shaped member 168 is in the position shown in FIG. 8, the flaps 136a' and 138a' are formed (see FIG. 7) pivoting respectively about the score lines 136a and 138a. FIG. 9 shows the tubular frame of FIG. 6 after the blades 164 and 166 and the wedge-shaped member 168 have been withdrawn. The frame is now in a position to be bent by any means to complete the corner, e.g., to form a right angled corner such as designated 170 in FIG. 12.

It should be noted that the flaps 136a' and 138a' (FIG. 7) have secured thereunder and thereto the flaps 132a' and 134a' of FIG. 1 inasmuch as the outside longitudinal panel 116b overlies the other outside longitudinal panel 116a. The aligned cuts 124a and 126a and the aligned score lines 132a, 136a and 134a, 138a permit the formation of the flaps shown in FIG. 9.

Figures 12, 13, 14, 15, 16, 17, 18, 19:
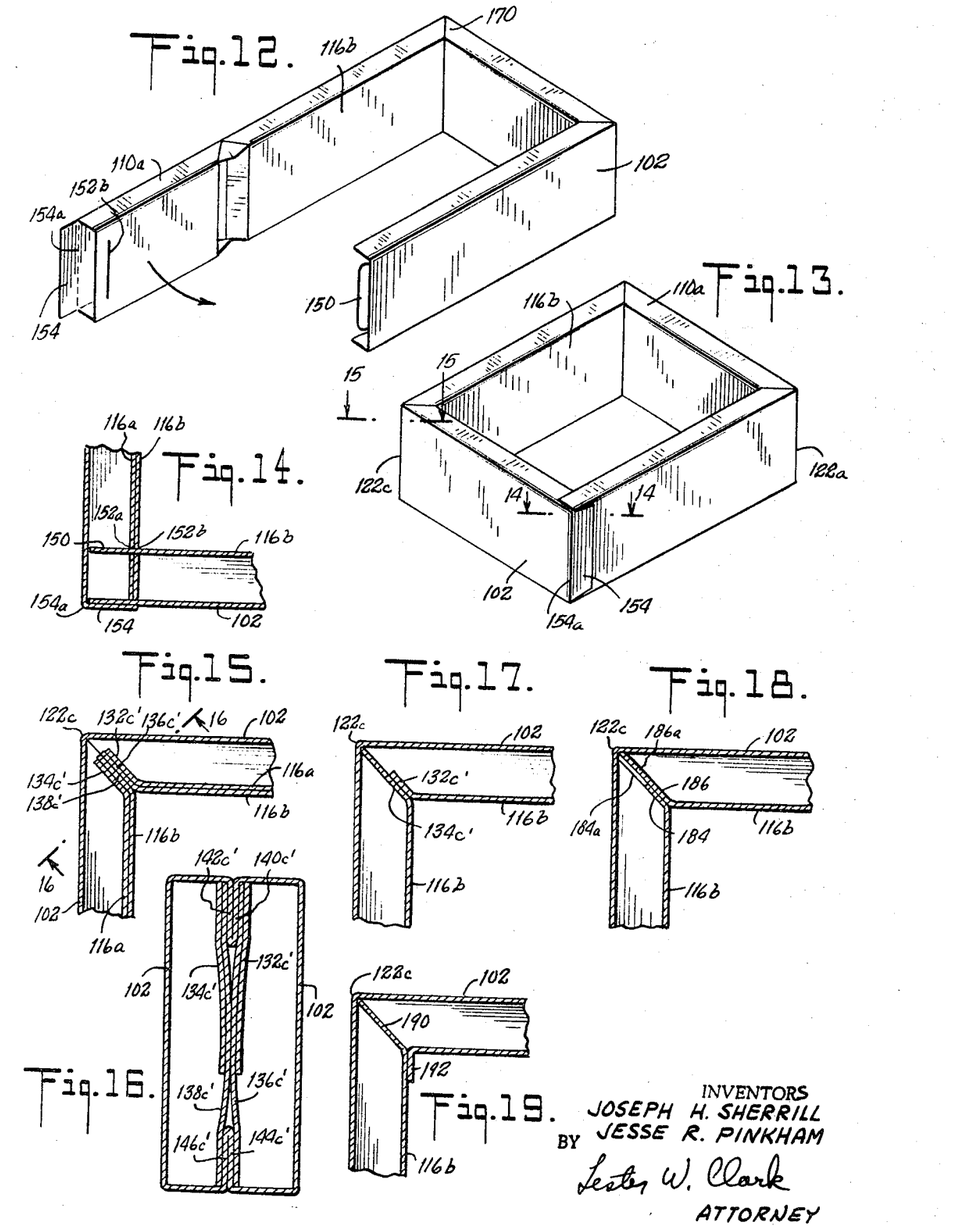
FIGS. 12 and 13 are perspective views showing the completion of the tubular frame of FIG. 6 into the shape of a package.
FIGS. 14 and 15 are sectional views of the tubular frame structure of FIG. 13, taken along lines 14—14 and 15—15 in FIG. 13.
FIG. 16 is a sectional view of the package corner of FIG. 15, taken along the section line 16—16 in FIG. 15.
FIGS. 17, 18 and 19 are sectional views of corners similar to the sectional view of FIG. 15 and showing modified corner arrangements.

Referring to FIGS. 12 and 13, the tubular frame is bent as shown in these figures at the corner sections to provide a frame of rectangular shape. All of the corners in the frame may be formed as just described. The ends of the frame may be attached as shown in FIG. 14. Specifically, the flap 150 may be inserted through the slits 152a and 152b. The flap 154 forming an end of the middle longitudinal panel 102 is creased about the transverse score line 154a so as to abut against the other end of the same panel surface, as shown in FIG. 14. The flap 154 may be adhesively secured to the panel surface by any means.

FIG. 15 shows in section one of the corners of the tubular frame of FIG. 13. Because of the abutting of the longitudinal panels 116a and 116b, there are four flaps 132c', 136c', 138c' and 134c' which extend toward the corner formed by the score line 122c. The two flaps 132c' and 136c' are adhered together, as are the flaps 134c' and 138c'. The adjacent flaps 136c' and 138c' may also be adhesively secured to each other to reinforce the corner.

FIG. 16 is another section of the same corner of the tubular frame showing the relationship of the panels and flaps at the corner. It will be noted that the flaps 132c' and 134c' do not extend the full width of the tubular frame but only for a portion of the width. The flaps 136c' and 138c' however do extend for the full width of the frame. This is because the longitudinal panel 116a (which forms the material of the flaps 132c' and 134c') is not as wide as the panel 116b (which forms the material of the flaps 136c' and 138c'). See FIG. 1. FIG. 16 also shows how the triangular flaps 140c', 142c' and 144c', 146c' are sandwiched between the other flaps just described. The triangular flaps are formed by the infolding of blank material at the corners, as described above in connection with FIGS. 7–9. Such triangular flaps correspond to the flaps 140a' and 142a' shown in FIG. 9.

The flaps 132c', 134c', 136c' and 138c' may be employed in different ways to render the corner structure of the tubular frame more rigid. In FIG. 15 all four of the flaps may be adhesively secured together by the application of suitable adhesive between the flaps 136c' and 138c' as noted above. The flaps 132c' and 136c' are secured together as are the flaps 134c' and 138c' during the formation of the tubular frame shown in FIG. 2, as discussed above.

FIG. 17 shows an alternative corner construction which is produced when a tubular frame such as shown in FIG. 10 is employed. In FIG. 10 a corner section 180 is shown. The corner section is the same as any of the corner sections shown in the frame of FIG. 6, except that the cut in the longitudinal panel 116b is offset somewhat. In FIG. 10 the cut is designated 126c' and should be compared with the cut 126c shown in FIG. 6. In FIG. 10, the cut 126c' is not in line with transverse score line 122c, whereas in FIG. 6 the cut 126c is in line with the transverse score line. The cut 126c' is, however, parallel to the transverse score line 122c, at least when the cut and line are considered in the blank that forms the tubular frame. By offsetting the cut 126c' with respect to the transverse score line 122c, the two flaps 132c' and 134c' are not of the same size as they are in the embodiment of FIG. 6. In particular, the flap 134c' is larger than the flap 132c'. It should be particularly noted that because of the increase in size of flaps 134c', the distance d1 is greater than distance d2. When distance d1 is greater than distance d2, and when the corner is formed as shown in FIG. 17, the free edge of the flap 134c' abuts against the corner formed by the transverse score line 122c in the panel surface 102. This abutting of flap free edge against panel surface corner stiffens the tubular frame structure and adds greater rigidity to the entire frame. It should be noted that when this offset cut construction is employed in the blank of FIG. 1, the cuts 124a, 124b and 124c as well as the cuts 126a, 126b and 126c will all be offset. The cuts on opposite sides of the blank will be aligned when the blank is formed to a tubular frame. For example, the offset cuts corresponding to cuts 124a and 126a in FIG. 1 will be aligned in the finished tubular frame. The section of FIG. 17, however, has been taken somewhat below the section line 15—15 in FIG. 13 so that no abutting of panel sections 116a and 116b is shown.

FIG. 11 shows an alternative corner structure similar to that of FIG. 10. In this case, however, cut 182 across the panel 116b follows an irregular course, and has segments on both sides of a line which is an extension of the transverse score line 122c (when considering the blank). Two flaps 184 and 186 are produced. Each flap has portions thereof which abut the corner in the outside panel surface 102 formed by the transverse score line 122c, as shown in FIG. 18. For example, the flap 184 has a portion 184a whose free edge engages the corner 122c; the flap 186 has a portion 186a that abuts the corner. Referring again to FIG. 11, the abutting of the free edges of these portions is brought about because the distance d1 for both flaps 184 and 186 is greater than the distance d2. In FIG. 18, as in FIG. 17, the overlapping of panels 116a and 116b has not been shown. The cutting of a blank such as that shown in FIG. 1 to produce the jogged cut 182 shown in FIG. 11 would be such that both outside longitudinal panels 116a and 116b would be cut alike so that the jogged cuts on both sides of the blank would be aligned in the completed frame.

FIG. 19 shows an alternative structure similar to that of FIGS. 17 and 18, in which one of the flaps 190 abuts against the corner formed by the transverse score line 122c in the outside surface 102. However, in this case the other flap 192 is secured to the panel surface 116b to complete the structure.

Figures 20, 21, 22, 23:
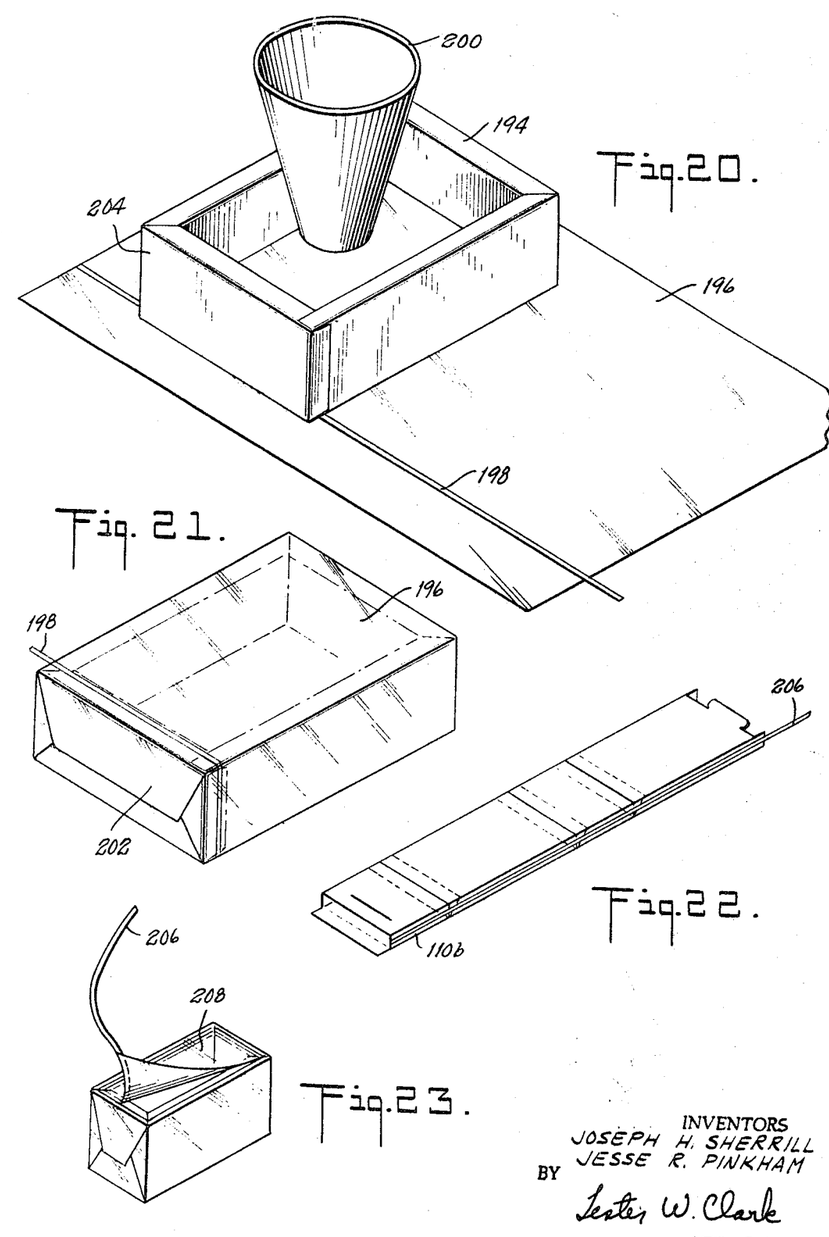
FIG. 20 is a perspective view of a tubular frame structure as shown in FIG. 13, ready for filling with a product and wrapping with a wrapper.
FIG. 21 is a perspective view of a completed package.
FIGS. 22 and 23 are perspective views of a tubular frame and tear tape structure in accordance with the invention.

FIG. 20 shows a tubular frame 194 produced by any of the techniques described above positioned over a wrapper 196. The wrapper includes a tear tape 198 thereon. A funnel 200 may be employed to fill the frame with a product to be packaged. Following the filling of the frame, the wrapper 196 is then wrapped about the frame by any of the well known wrapping techniques to produce the completed package shown in FIG. 21. Typically, the wrapper 196 is made of transparent material so that the contents of the package held within the frame and between the open front and rear faces of the frame may be viewed. The tear tape 198 is pulled to tear off end 202 of the wrapper and to permit the end section 204 (FIG. 20) of the tubular frame to be raised to gain access to the contents of the package.

FIG. 22 shows an alternative tear tape arrangement in a tubular frame package. A tear tape 206 is employed positioned against the longitudinal surface 110b of the frame. The frame is thereafter closed to rectangular shape and then enclosed by a wrapper, as shown in FIG. 23. The tear tape is thus positioned about an open face of the frame so that, when the tear tape is pulled, open face 208 of the wrapper is torn away, making accessible the contents of the tubular frame package. With this tear tape arrangement, the tubular frame itself does not have to be opened as in the embodiment of FIG. 21. A package as shown in FIG. 23 will normally be employed when a material is packaged which is to be completely removed from the package during a single use and the package is to be discarded.

Figures 24, 25, 26, 27, 28, 29:
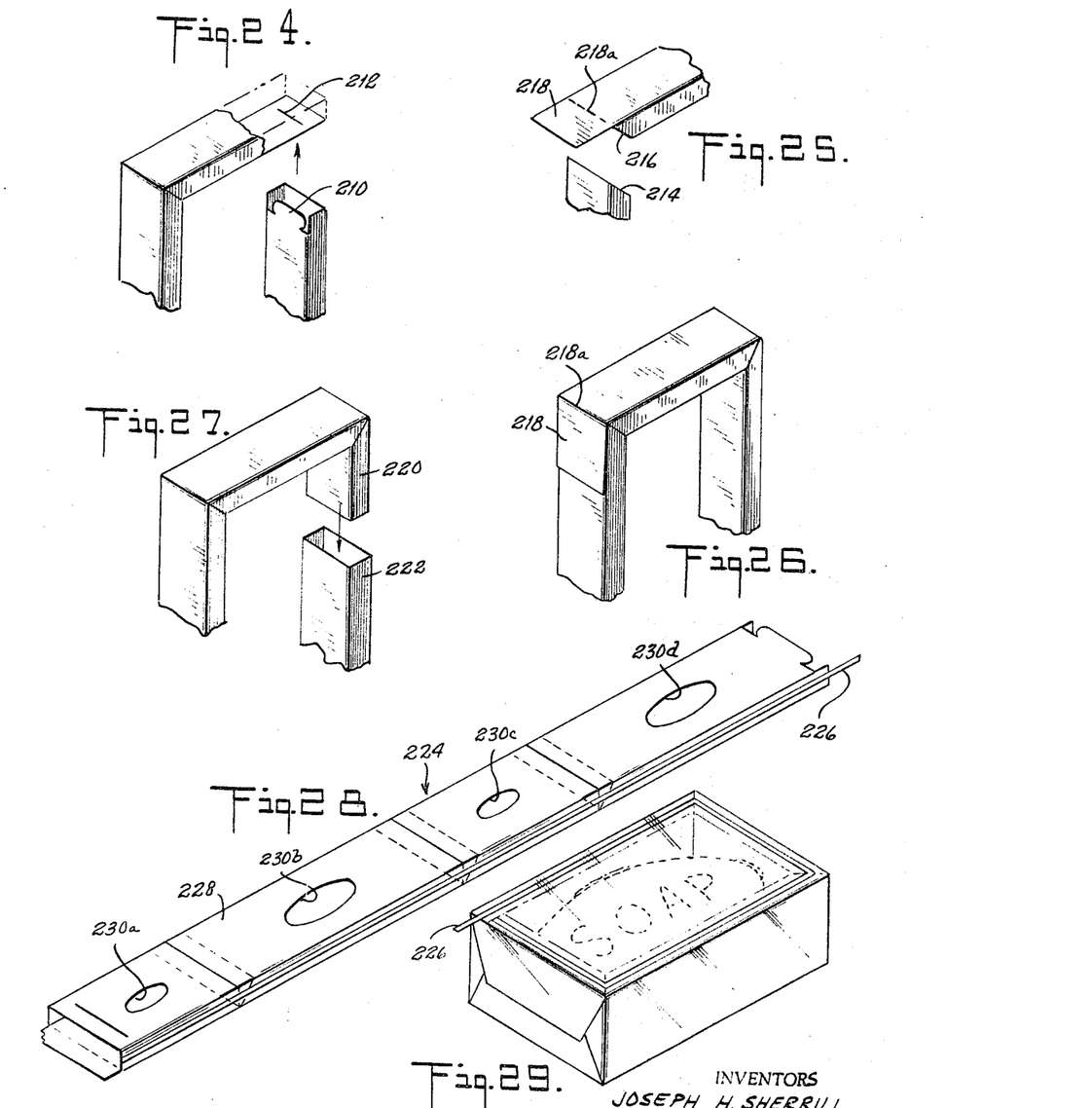
FIGS. 24, 25, 26 and 27 are fragmentary perspective views showing various closures for the ends of a tubular frame structure.
FIGS. 28 and 29 are perspective views of a tubular frame structure and package particularly adapted to hold a solid product such as a bar of soap.

FIGS. 24–26 show alternative closures at the end of a tubular frame in accordance with the invention. In FIG. 24 a tab 210 is employed which passes through a slit 212 in a panel surface. In FIG. 24 there is no overlapping flap corresponding to the flap 154 in FIG. 14. Otherwise, the closure is the same as that shown in FIG. 14.

FIGS. 25 and 26 shown an alternative closure in which the ends of the tubular frame are mitered, as at 214 and 216, so that they abut at a smooth joint. Flap 218, which may pivot about a score line 218a in one of the outside panel surfaces, is adhesively secured to the surface against which it abuts.

FIG. 27 shows yet another closure in which one end 220 of a tubular frame fits within the other end 222 of the frame.

FIG. 28 shows a frame 224 and a tear tape 226 constructed in the same fashion as the frame and tear tape in FIG. 22. In this case, however, the inside panel surface 228 of the frame is provided with cut-outs 230a, 230b, 230c and 230d. The cut-outs are to retain a solid material securely within the frame when the frame is formed to a package, as shown in FIG. 29. Such a material may constitute a bar of soap as shown in this figure.

FIGS. 30–34 show an alternative tubular frame suitable for use in a package containing a product which is to be dispensed many times. The frame and its corners correspond to any of the frames discussed above. However, an additional end closure section 232 is employed. Before the frame discussed as to the closure, it will be helpful first to consider FIG. 34a, which shows a blank for such a frame.

The blank is similar to the blank of FIG. 1, except at end portions 234 and 236. Like reference numerals have been employed in FIGS. 1 and 34a to designate identical parts. The outside panel 116a includes an outwardly extending flap 238 scored to provide flap sections 238a and 238b. Similarly, the outside panel 116b includes an outwardly extending flap 240 scored to provide flap sections 240a and 240b. At the other end 236 of the blank, outside panel 116a is cut out, as at 242. The inside portion of this panel surface adjacent to the cut-out is slit, as at 244, and scored so as to provide a flap having sections 246a and 246b. A similar cutout 242' is provided in the other outside panel 116b, and the panel is similarly slit and scored to provide flap sections 246a' and 246b'. On the other side of the cut-outs 242 and 242', blank material is provided in the form of flaps 250 and 250'. The score lines 104 and 106 extend from one end of the blank to the other end of the blank. Score lines 112' and 114' are in line with the corresponding longitudinal score lines 112 and 114 in the main body of the blank. The blank is scored with diverging score lines, as at 140d, 142d and 144d, 146d to provide for the infolding of blank material at the corners of the frame as explained above. The central portion of the blank at the end 236 is cut away as at 260 and is slit as at 262 (and also scored) so as to provide flaps having sections 264a, 264b and 266a, 266b.

Figure 30:
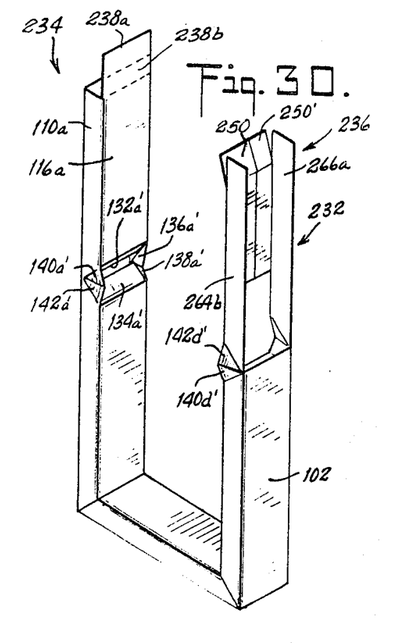
FIGS. 30, 31 and 32 are perspective views of a tubular frame structure embodying an end closure in accordance with the invention.
Figure 31:
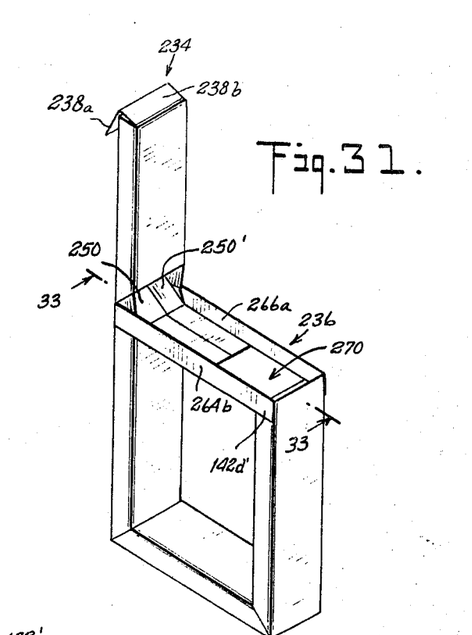
Figure 34:
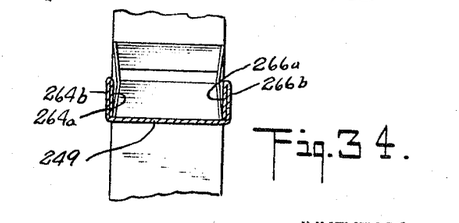
FIG. 34 is a fragmentary sectional view of the tubular frame shown in FIG. 33, taken along the section line 34—34 of FIG. 33.
Figure 34A:
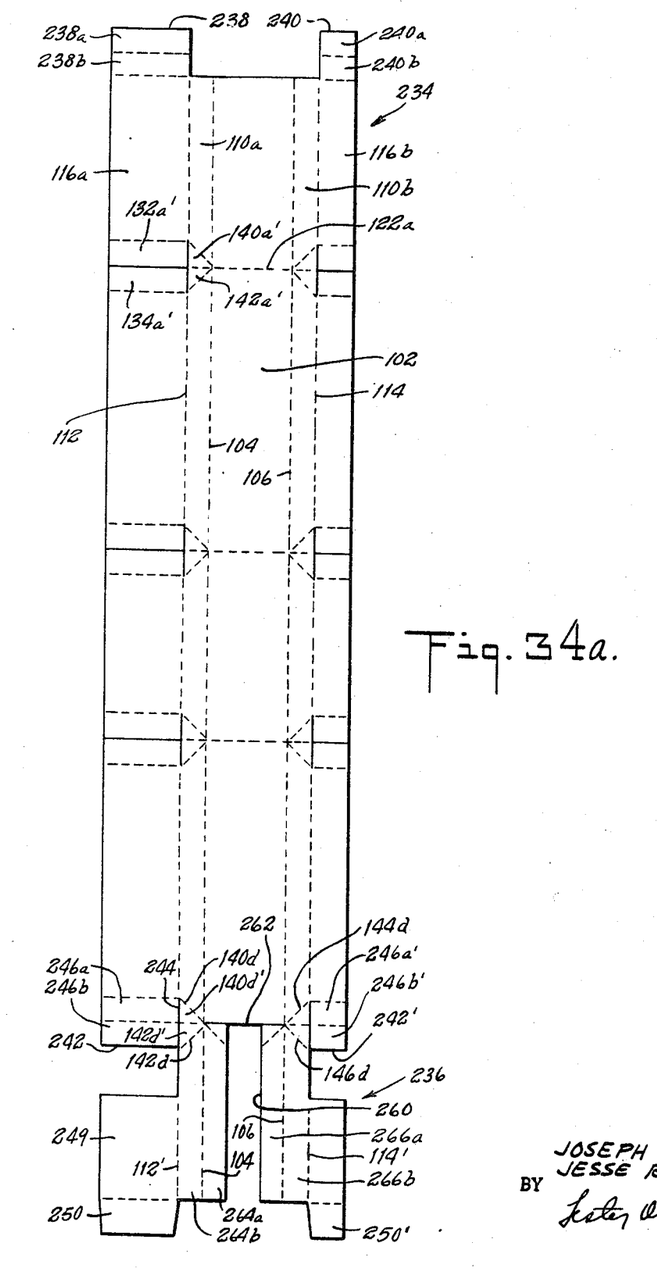
FIG. 34a is a plan view of a blank for a tubular frame structure such as shown in FIGS. 30–34.

The blank of FIG. 34a is formed to a tubular frame as shown in FIG. 30. The corners are formed as described in connection with FIG. 1. As shown in FIG. 31, the end 236 is first pivoted downwardly to provide an underlying end closure at one end of the frame. In this respect the flaps 140d' and 142d' shown in FIG. 30 bend outwardly to provide the overlapping corner as shown in FIG. 31. Next, the other frame end 234 is pivoted downwardly to form an overlapping frame end as in FIG. 32. In this connection the flaps 140a' and 142a' pivot inwardly, as shown in FIG. 30, in forming the corner.

Figure 33:
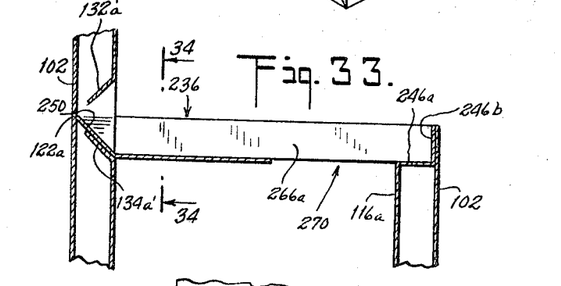
FIG. 33 is a fragmentary sectional view of the tubular frame shown in FIG. 31, taken along the section line 33—33 of FIG. 31.

FIG. 33 shows the frame in section in its partially closed position when only the underlying frame end 236 has been moved downwardly. The overlapping of panels 116a and 116b has not been shown in the sectional view of FIG. 33 for clarity of illustration. The overlapping is, however, shown in FIG. 30 (see the overlapping of flaps 250 and 250'). In FIG. 33 the flap end 250 passes between the flaps 132a' and 134a'. The free end of the flap 250 abuts against the score line 122a in the outer panel surface 102 of the frame to strengthen the corner formed at the score line. The flaps 246a and 246b are positioned as shown, with the flap 246b abutting the frame panel surface 102 and being secured thereto to close off the otherwise open end of this section of the tubular frame. The underlying frame end 236 provides an opening 270 shown in FIGS. 31 and 33 through which the product within the frame may be dispensed.

Figure 32:
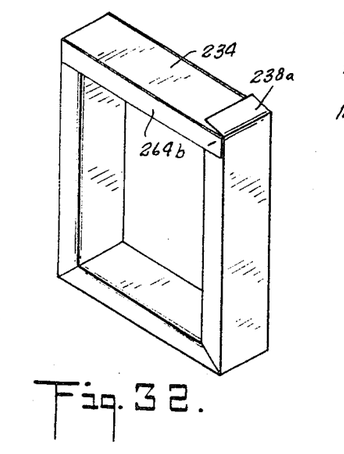

In the closed form of the frame shown in FIG. 32, the flap 238a protrudes from the end of the package and may be pulled upwardly in order to open the overlying frame end 234 to expose the underlying frame end 236 and the cut-out 270 in order to dispense the contents of the package. For clarification and illustration, the frame of FIG. 32 has not been shown wrapped in a wrapper. Any suitable wrapper will suffice.

Figure 35A:
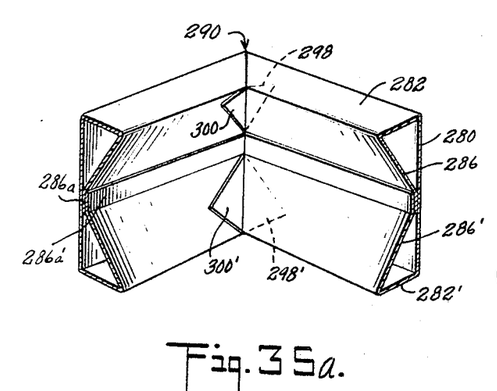
FIGS. 35a–35c, 36a–36c, 37a–37c and 38a–38c are various views of portions of tubular frames and blanks therefor providing different cross-sectional shapes for tubular frames in accordance with the invention.
Figure 35B:
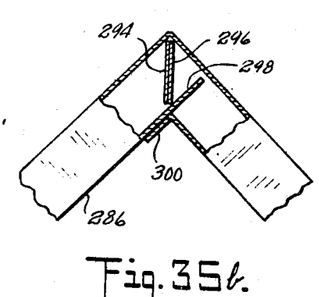

FIG. 35a shows an alternative form of tubular frame construction embodying the invention. An outside panel surface 280, panel surfaces 282 and 282' perpendicular thereto, and panel surfaces 286 and 286' inclined thereto make up the tubular frame. In cross section the frame appears as two triangles having abutting apexes. Corner 290 of the tubular frame is provided by transverse scoring in the outside panel surface 280 (score line 292 in the blank of FIG. 35c), infolding of the panels 282 and 282' (as shown by the two infolded flaps 294 and 296 in FIG. 35b) and by flaps 298, 300 and 298', 300' (also shown in FIG. 35b). The flaps 300 and 300' may be secured to the panel surfaces 286 and 286'. FIG. 35b shows the panel 300 secured to the surface 286. The flaps 298 and 298' may extend inside of the tubular frame. It will be noted from FIG. 35a that side edge 286a' of the panel surface 286' overlies the corresponding side edge 286a of the panel surface 286. The overlapping side edges are adhesively secured to each other.

Figure 35C:
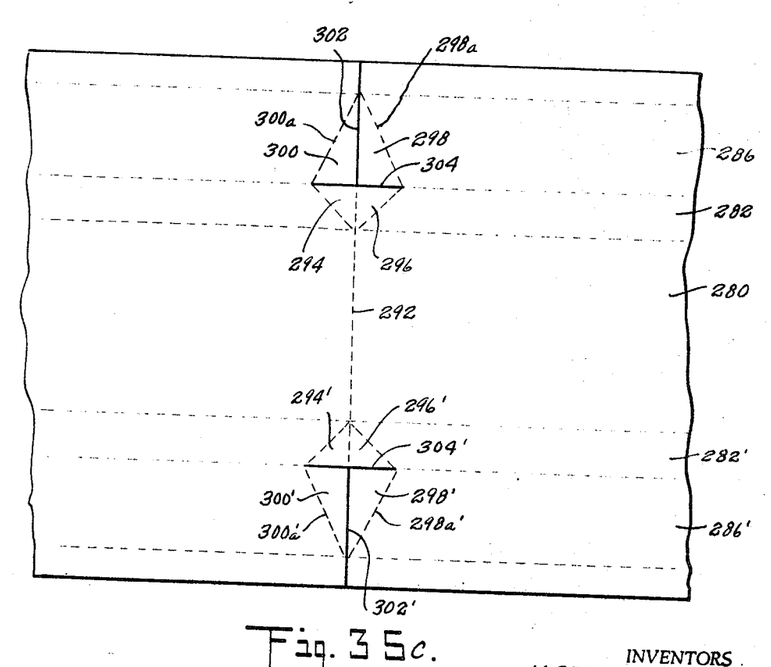

FIG. 35c shows the blank employed to produce the tubular frame structure shown in FIG. 35a. It will be noted that cuts 302 and 302' that aid in the formation of the flaps 298, 300 and 298', 300' are in line with the transverse score line 292 across the panels 280, 282 and 282'. Cuts 304 and 304' perpendicular to the cuts 302 and 302' and intersecting said cuts are also employed to create the flaps just mentioned. Further, the flaps 298, 300 and 298', 300' are formed by diverging score lines 298a, 300a and 298a', 300a'.

Figure 36A:
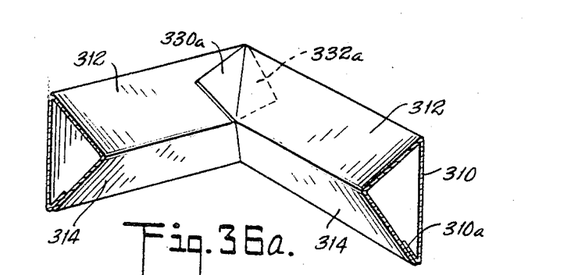
Figure 36B:
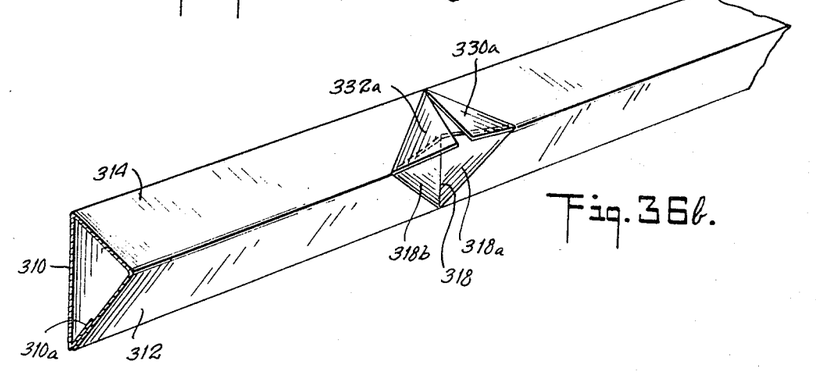
Figure 36C:
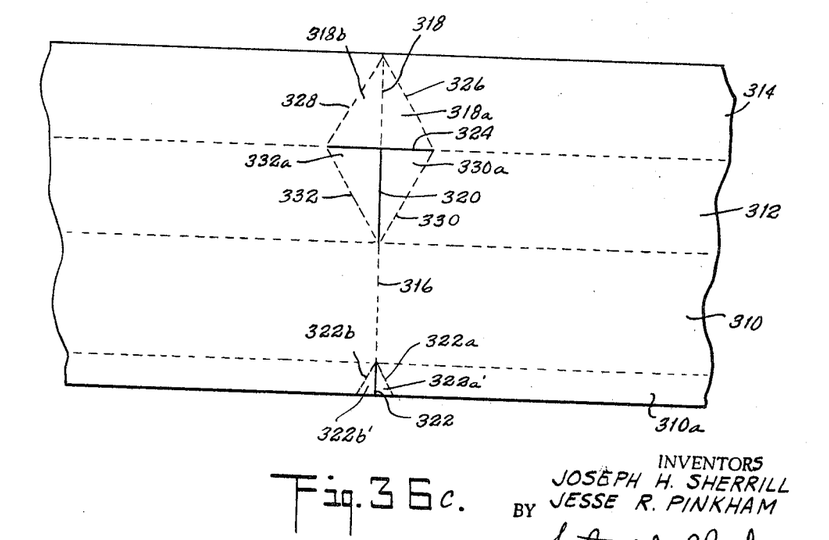

FIG. 36a shows another form of tubular frame construction, the blank for which is shown in FIG. 36c. The The tubular frame is triangular in section, formed by an outer panel surface 310, "inside" panel surfaces 312 and 314 and an overlapped side edge 310a. The blank includes transverse score line 316 across the panel 310, transverse score line 318 in line therewith across the panel 314 and two cuts 320 and 322 also in line therewith across the panels 312 and 310a. The cut 322 might be omitted and a score line substituted therefor; however, the cut aligns with the score line 318 for the infolding of blank material to form a corner, and a cut relieves the bunching of material when two panels such as 314 and 310a are both involved at the corner. The cut 322 is thus preferred in connection with score lines 322a and 322b to provide two flaps 322a' and 322b' which align with corresponding flaps 318a and 318b provided by cut 324 and diverging score lines 326 and 328 in the panel 314. Diverging score lines 330 and 332 are also employed in the panel 312 to provide two flaps 330a and 332a. As shown in FIG. 36b the flaps 318a and 318b infold to permit the corner in the tubular frame, and in the finished corner the flap 330a is secured to panel surface 314. The flap 332a extends inside the tubular frame structure.

Figures 37A, 37B:
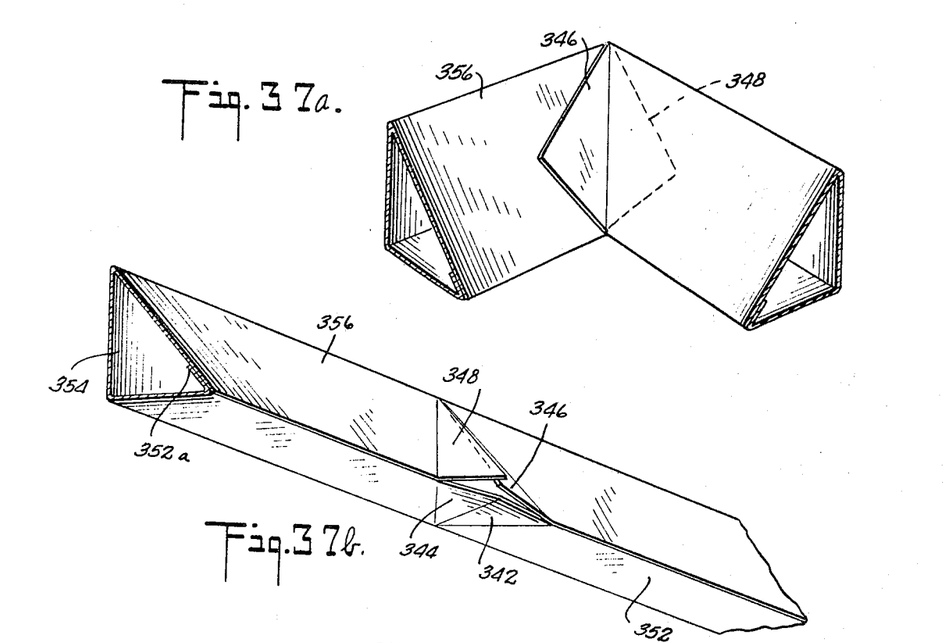
Figure 37C:
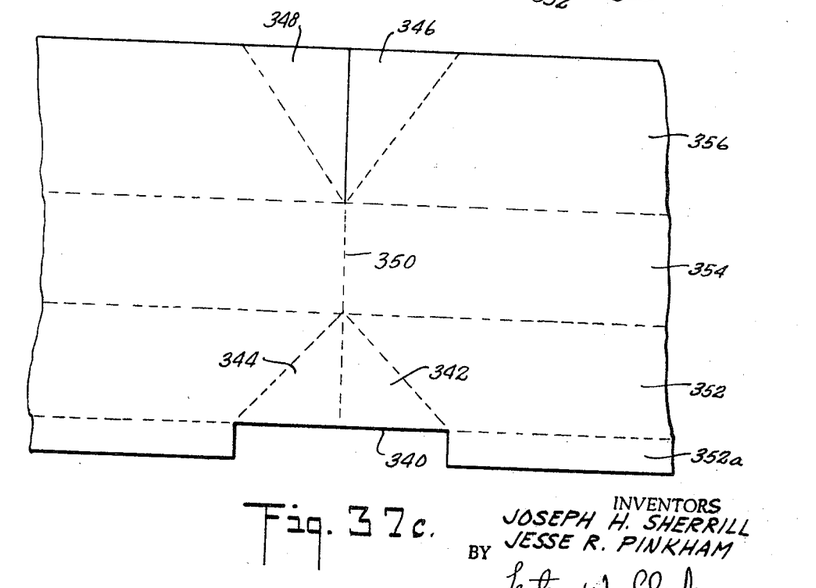

FIG. 37a shows a tubular frame structure also triangular in section similar to the tubular frame structure shown in FIG. 36a. The only significant difference between the two frames lies in the blank employed. The blanks of FIGS. 37c and 36c are similar; the main distinction being the cut-out 340 employed in the blank of FIG. 37c (as distinguished from the flaps 322a' and 322b' in FIG. 36c). The blank is scored to provide two triangular flaps 342 and 344 which correspond to the flaps 318a and 318b of FIG. 36c. The blank is also cut and scored to provide two flaps 346 and 348 which correspond to the flaps 330a and 332a in FIG. 36c. Score line 350 corresponds to score line 316 of FIG. 36c. The blank is folded to the shape shown in FIG. 37b, in which the flaps 342 and 344 are infolded to provide a corner in panel surface 352. The transverse score line 350 provides the corner in the outer panel surface 354. Flaps 346 and 348 assume the positions shown in FIG. 37a, with the flap 346 being secured to the outer surface of panel 356 and with the flap 348 extending inside the tubular frame. Longitudinal side edge 352a of the panel 352 is secured to the edge of the panel 356. As explained above, the cut-out 340 in the side edge accommodates the infolding of the flaps 342 and 344 in the panel surface 352.

Figures 38A, 38B:
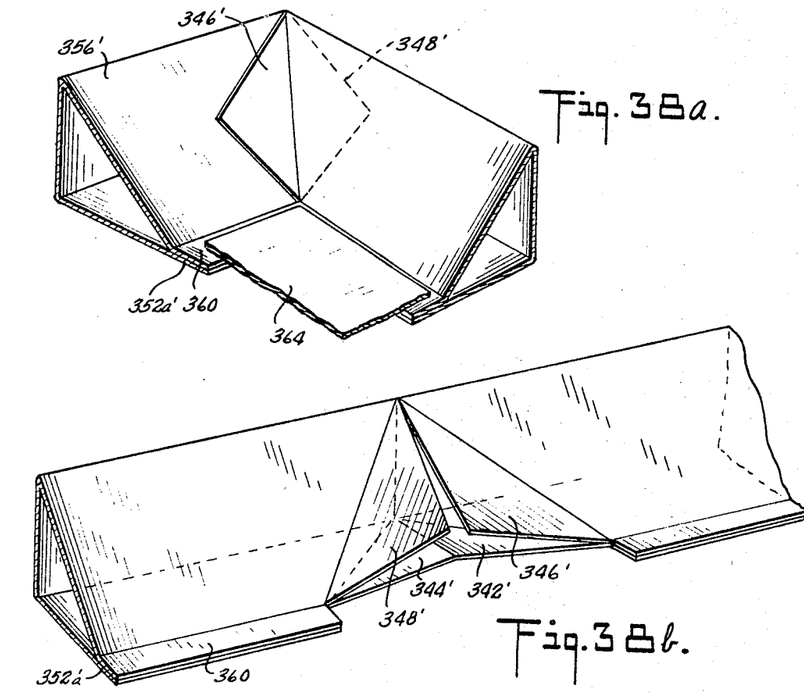
Figure 38C:
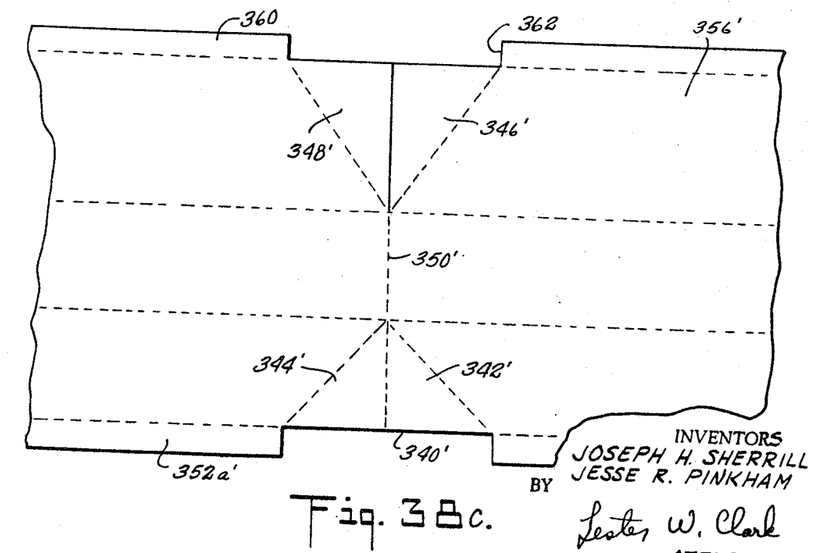

FIG. 38a shows a further form of tubular frame structure formed from a blank shown in FIG. 38c. The blank of FIG. 38c is identical to the blank of FIG. 37c, except for the addition of a side panel 360 which includes a cut-out 362 adjacent flaps 346' and 348'. In the blank of FIG. 38c the same reference numerals are employed as in FIG. 37c with the addition of primes in FIG. 38c. The side panel 352a' underlies the side panel 360 as shown in FIG. 38b. The tubular frame is triangular in cross section with a longitudinal web formed by the secured together panels 352a' and 360 extending from the apex of the triangle. The flaps 342', 344' and 346', 348' fold and are positioned as shown in FIGS. 38a and 38b to complete the tubular corner of the frame, with the flap 346' being secured to the outer surface of panel 356'. The flap 348' extends inside the tubular frame. The flange formed by the abutting panel edges 352a' and 360 extends about the inside of the tubular frame, which may be in the shape of a rectangle. This flange provides a supporting surface for a sheet 364 of any material such as paperboard to serve as a base for a carton.

Figure 39:
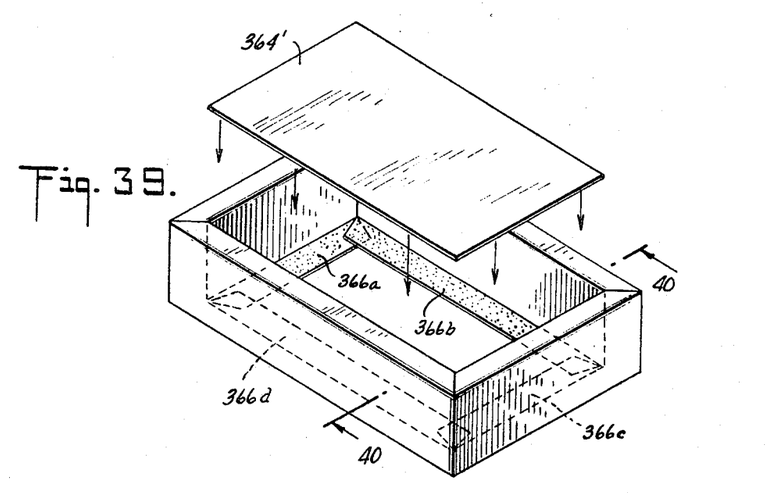
FIGS. 39 and 40 are perspective and sectional views of a tubular frame package employing a supporting sheet in accordance with the invention.
Figures 40, 41, 42:
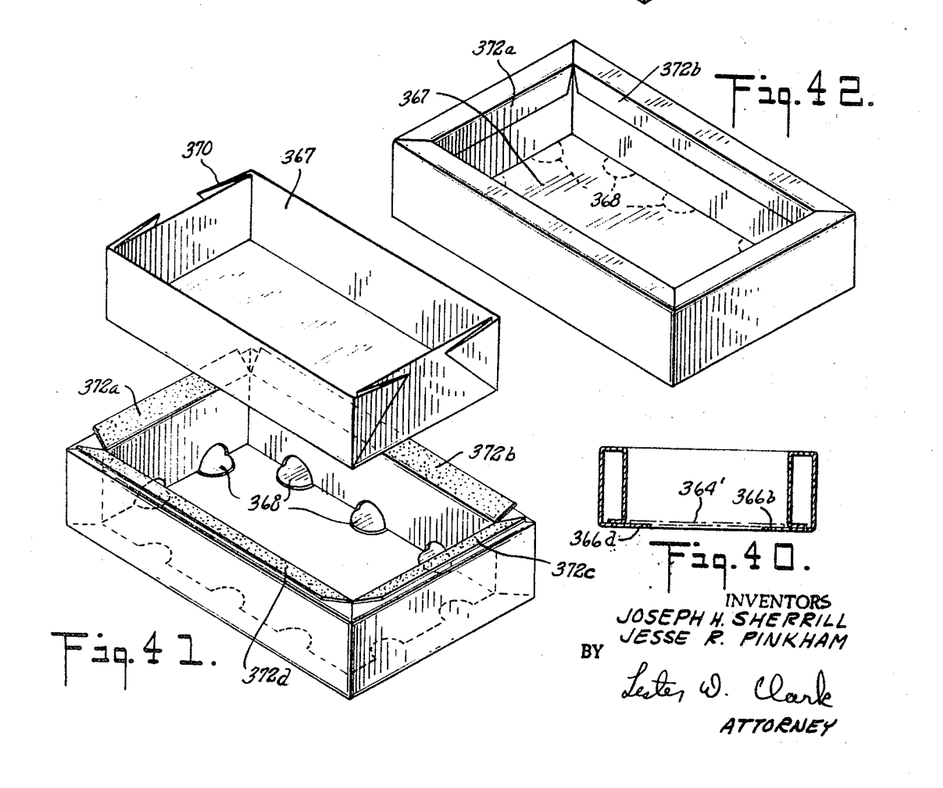
FIGS. 41 and 42 are perspective views of a tubular frame package including a liquid tight tray in accordance with the invention.

FIGS. 39 and 40 show a carton having a sheet of material 364' the same as the sheet 364 of FIG. 38a. The tubular frame in FIG. 39 is rectangular in cross section rather than triangular in cross section as in FIG. 38a. The tubular frame in FIG. 39 is the same as that shown in FIG. 6, for example, except that laterally extending bottom panels 366a, 366b, 366c and 366d are employed. Such panels may be formed from an additional side panel cut from a blank such as that shown in FIG. 1, in which the additional side panels form an outer extension of the panel 116b. The bottom panels 366a–366d may be provided with an adhesive material so that the bottom sheet 364' adheres thereto, or the sheet material may be secured to the bottom panels by the application of heat and pressure in the event that heat sealable materials are employed.

FIGS. 41 and 42 show a box type structure similar to that of FIGS. 39 and 40. A tray 367 is substituted for the bottom sheet 364' and is maintained in place by tabs 368. The tabs may be cut from the panel 116b of FIG. 1, for example, so as to pivot about the longitudinal score line 114. The tray 367 may be formed from a single sheet of material, such as paperboard, having folded ends 370 (well known in the prior art) to provide a water-tight tray. The tray is advantageously coated so that it may hold liquid therein. The tray is positioned within the tubular frame as shown in FIG. 42. Upper inwardly extending panels 372a, 372b, 372c and 372d may be folded over the top edge of the tray and may be adhesively secured to the tray to maintain the tray in place. The panels 372a–372d may be formed from an additional side panel constituting an extension of the panel 116b, in the same fashion as the panels 366a–366d of FIG. 39 are formed. The structure of FIG. 42 may be used as a poultry container, for example, and is normally covered by a transparent wrapping material.

Various embodiments of the invention have been disclosed which are susceptible of modification. The invention should be taken to be defined by the following claims.

What is claimed is:

1. A blank for a rectangular tubular package, comprising a sheet of bendable material scored with:
  (a) two outside and two inside substantially parallel longitudinal score lines to provide two outside, two intermediate and one middle longitudinal panels,
  (b) three substantially parallel transverse score lines across the middle longitudinal panel and the two intermediate longitudinal panels adjacent thereto,
  (c) three primary cuts across each of the two outside longitudinal panels adjacent the ends of said transverse score lines,
  (d) three secondary cuts along each of the two outside longitudinal score lines intersecting said three primary cuts, and
  (e) diagonal score lines from the ends of each of said three secondary cuts to the intersection of the adjacent one of said transverse score lines with the adjacent one of said inside longitudinal score lines.

2. A blank as defined in claim 1, wherein each primary cut extends across the associated one of the two outside longitudinal panels along a line which is offset from and substantially parallel to a line which is the extension of the associated one of said transverse score lines.

3. A blank as defined in claim 1, wherein each primary cut extends across the associated one of the two outside longitudinal panels on both sides of a line which is the extension of the associated one of said transverse score lines.

4. A blank as defined in claim 1, including a tab formed in one end of said blank in one of said outside longitudinal panels, and a slit in the opposite end of said blank in at least one of said outside longitudinal panels.

5. A blank as defined in claim 1, wherein additional transverse score lines are included in a first end of the blank across the two outside and two intermediate longitudinal panels, a transverse cut extending across the middle longitudinal panel at the first end of the blank, the two outside longitudinal panels at the first end of the blank including cutaway portions extending from the edges of the blank inwardly to the outside longitudinal score lines, and the middle longitudinal panel at the first end of the blank being cut-away in at least the mid portion thereof from the end of the blank to said transverse cut.

6. A corner section in a blank for a tubular frame package, comprising a first panel having a first score line thereacross to provide a corner in a first surface of the completed package frame, a second panel having: (a) a second score line thereacross in line with the first score line and (b) two additional score lines thereacross not in line with the first score line and extending from one end of the second score line to provide for the infolding of the blank material in a second surface of the completed package frame adjacent to the corner in the first surface, and a third panel having a cut thereacross and score lines thereacross adjacent to the cut, said cut and score lines defining two adjacent flaps in said third panel to permit a corner to be formed in a third surface of the completed package frame adjacent to the corner in the first surface.

7. A corner section in a blank for a package as defined in claim 6, wherein said cut is in line with said first score line.

8. A corner section in a blank for a package as defined in claim 6, wherein said cut is not in line with but is substantially parallel to said first score line.

9. A corner section in a blank for a package as defined in claim 6, wherein said cut extends across the third panel on both sides of a line which is in line with said first score line.

10. A corner section in a blank for a tubular frame package as defined in claim 6, wherein said cut comprises a first cut in line with said first score line, and said score lines adjacent to said cut both extend from one end of the cut and across the third panel along lines which diverge away from the cut.

11. A corner section in a blank for a tubular frame package as defined in claim 10, wherein the ends of said diverging score lines are joined by a second cut in said blank perpendicular to and intersecting said first cut.

12. A corner section in a blank for a tubular frame package as defined in claim 6, wherein said cut comprises a first cut in line with said first score line, said score lines adjacent to said first cut are parallel to the cut, and said parallel score lines are joined by a second cut perpendicular to and intersecting said first cut.

13. A tubular frame package having a plurality of corners, each corner having a plurality of panel surfaces that enclose a space, said corner being defined by:
  (a) a first panel surface on the outside of the frame scored to provide a corner in the panel surface,
  (b) a second panel surface adjacent to the first panel surface and infolded about score lines therein to provide a corner in that surface, and
  (c) at least one remaining panel surface slit and scored on both sides of the slit to provide flaps which permit a corner in that surface;
the ends of said tubular frame being joined together by a tab in one of said panel surfaces and a corresponding slit in another one of said panel surfaces, said tab being inserted through said slit; and further including an extension on the end of one of said panel surfaces overlying and secured to an adjacent portion of another one of said panel surfaces.

14. A tubular frame package having a plurality of corners, each corner having a plurality of panel surfaces that enclose a space, said corner being defined by:
  (a) a first panel surface on the outside of the frame scored to provide a corner in the panel surface,
  (b) a second panel surface adjacent to the first panel surface and infolded about score lines therein to provide a corner in that surface, and
  (c) at least one remaining panel surface slit and scored on both sides of the slit to provide flaps which permit a corner in that surface;
said package including two frame sections, one overlying the other, to form an end of the package, the underlying frame section including an opening in one of the panel surfaces thereof to provide access to the interior of the package.

15. A tubular frame package having a plurality of corners, each corner having a plurality of panel surfaces that enclose a space, said corner being defined by:
  (a) a first panel surface on the outside of the frame scored to provide a corner in the panel surface,
  (b) a second panel surface adjacent to the first panel surface and infolded about score lines therein to provide a corner in that surface, and
  (c) at least one remaining panel surface slit and scored on both sides of the slit to provide flaps which permit a corner in that surface;
said package including flange means forming a portion of one of said panel surfaces extending inwardly of the frame to provide a supporting surface, and a sheet supported by and secured to the flange means to provide a base supporting surface in the tubular frame package.

16. A tubular frame package having a plurality of corners, each corner having a plurality of panel surfaces that enclose a space, said corner being defined by:
(a) a first panel surface on the outside of the frame scored to provide a corner in the panel surface,
(b) a second panel surface adjacent to the first panel surface and infolded about score lines therein to provide a corner in that surface, and
(c) at least one remaining panel surface slit and scored on both sides of the slit to provide flaps which permit a corner in that surface;

said package including first flange means forming a portion of one of said panel surfaces extending inwardly of the frame, and a tray positioned within the frame and supported by said first flange means.

17. A tubular frame package as defined in claim 16, including second flange means forming a portion of one of said panel surfaces and secured to side surfaces of said tray to aid in retaining said tray in said frame.

References Cited

UNITED STATES PATENTS

| | | | |
|---|---|---|---|
| 2,450,110 | 9/1948 | Brooks. | |
| 2,781,898 | 2/1957 | Desmond et al. | 229—34 X |
| 2,893,622 | 7/1959 | Fogel | 229—34 |
| 2,973,893 | 3/1961 | Garlin et al. | 229—40 |
| 3,082,864 | 3/1963 | Silver | 229—14 X |
| 3,254,434 | 6/1966 | Gintoft | 40—129 |
| 3,262,620 | 7/1966 | Burt et al. | |
| 3,270,870 | 9/1966 | Burt | 206—45.33 |
| 3,271,357 | 9/1966 | Burt | 206—45.33 |

DAVIS T. MOORHEAD, *Primary Examiner.*

U.S. Cl. X.R.

40—129; 206—45.34, 45.14, 45.33; 229—34, 40, 51